Patented Mar. 18, 1947

2,417,424

UNITED STATES PATENT OFFICE 2,417,424

CHEMICAL MODIFICATION OF RUBBER

George H. Latham, Wilmington, Del., assignor to E. I. du Pont de Nemours & Company, Wilmington, Del., a corporation of Delaware No Drawing. Application July 23, 1941, Serial No. 403,763

11 Claims. (Cl. 260—768)

This invention relates to rubbers both natural and synthetic, and to their modification.

This invention has as an object the provision of a process for the chemical modification of rubbers. A further object is the preparation of rubbers of improved gas and oil resistance. Another object is the preparation of vulcanizable rubbers of low solubility. Other objects will appear hereinafter.

These objects are accomplished by the following invention wherein an active hydrogen-containing rubber, particularly an aldehyde-modified rubber, that is, a reaction product of an aldehyde, preferably formaldehyde or its polymers, with a rubber is reacted with an organic compound having a plurality of —N=C=X groups, wherein X is a chalcogen of atomic weight below 33, i. e., oxygen or sulfur.

The term "active hydrogen-containing rubber" is used to describe rubbers which contain active hydrogen as determined by the Zerewitinoff method (Zerewitinoff, Ber. 40, 2023 (1907); Ber. 41, 2236 (1908); and Kohler, J. Am. Chem. Soc. 49, 3181 (1927)). The active hydrogen-containing rubbers contain groups such as —OH, —NH$_2$, —NRH, —COOH and —SH. Useful rubbers of this class are "hydroxylated rubbers," i. e., rubbers containing an hydroxyl group. The invention will be described with particular reference to aldehyde-modified rubbers since they constitute a preferred type of active-hydrogen containing rubber.

A particularly desirable aldehyde-rubber reaction product is that obtained by reacting natural rubber with 1,3,5-trioxane, preferably at 50–150° C. in the presence of an acidic catalyst and a solvent for the trioxane and rubber, or by milling together rubber, trioxane (or other formaldehyde-generating material) and an acidic catalyst as illustrated more fully below.

The more detailed practice of the invention is illustrated by the following examples, wherein parts given are by weight. There are of course many forms of the invention other than these specific embodiments.

EXAMPLE I

Trioxane-modified rubber (47 parts), prepared as described below, is placed in a solution of 11 parts of hexamethylene diisocyanate in 86 parts of toluene and the mixture heated on a steam bath for 16 hours. The reaction mixture is diluted with carbon tetrachloride and the diisocyanate-treated, trioxane-modified rubber is separated, washed with fresh carbon tetrachloride, and dried on a steam plate. The product thus obtained is harder, less soluble, and less elastic than the original trioxane-modified rubber, and darkens at about 175° C. without softening. Vulcanization of the product can be carried out by the use of the technique commonly employed with ordinary rubber. For example, 100 parts of diisocyanate-treated, trioxane-modified rubber, 2.5 parts of sulfur, 1 part of stearic acid, 5 parts of zinc oxide, 1 part of 2-mercapto-benzothiazole, and 1 part of phenyl beta-naphthylamine are mixed well by milling, then heated for an hour at about 140° C. in a vulcanization mold. This process converts the diisocyanate-treated, trioxane-modified rubber to a tough vulcanizate considerably less sensitive to hydrocarbon solvents than either vulcanized natural rubber or the vulcanizate of trioxane-modified rubber. The following table illustrates the solvent resistances of these vulcanized products to typical commercial organic liquids.

SOLVENT RESISTANCE OF VULCANIZED PRODUCTS

*Increase in length after 48 hours' exposure at room temperature*

| Solvent | Natural rubber | Trioxane treated rubber | Trioxane-treated rubber, after treated with hexamethylene diisocyanate |
|---|---|---|---|
| | Per cent | Per cent | Per cent |
| Gasoline | 69 | 49 | 17 |
| Toluene | 83 | 71 | 29 |
| Soybean oil | 11 | 9 | 3 |
| Butyl acetate | 51 | 49 | 17 |
| Ethyl alcohol and acetone | 6 | 11 | 9 |
| Light lubricating oil | 14 | 11 | 6 |

The trioxane-modified rubber intermediate is prepared by adding a solution of 20 parts of zinc chloride in 180 parts of glacial acetic acid to a stirred solution of 200 parts of 30 minute milled natural rubber and 100 parts of 1,3,5-trioxane (an excess) in 3830 parts of carbon tetrachloride at 65° C. and continuously agitating the solution at 65° for four hours, washing the carbon tetrachloride solution twice with dilute aqueous solutions of ammonium chloride containing ammonia or other alkali to neutralize the acid, and then with water. The solvent is removed by steam distillation and the product milled with one per cent of its weight of an antioxidant, namely phenyl beta-naphthylamine. The trioxane-modified rubber can also be isolated from the reaction mixture by the addition of a coagulating medium such as alcohol. Analytical data for trioxane-modified rubber prepared in the above manner are given below.

| Analysis for— | Trioxane-modified rubber | Natural rubber theoretical for $(C_5H_8)_n$ |
|---|---|---|
| | Per cent | Per cent |
| C | 78.21 | 88.2 |
| H | 10.59 | 11.8 |
| Ash | 3.72 | |
| O (by difference) | 7.48 | 0 |
| Iodine No | 264 | 373 |

The modification of rubber by trioxane may also be accomplished by agitating 50 parts of natural rubber in a Werner and Pfleiderer mixer with 25 parts of trioxane (or paraformaldehyde), 5 parts of zinc chloride and 13 parts of glacial acetic acid for 15 minutes, heating the mixture at 60-70° C. for one hour, washing on a rubber wash mill, incorporating 1% antioxidant, and drying. Other conjugated diene rubbers may be used in place of ordinary rubber.

EXAMPLE II

Five and one-half parts of m-phenylene diisocyanate is added to 45 parts of a 10% solution of aldehyde-modified neoprene (prepared as described below) in toluene. The mixture is heated on a steam bath for 10 hours and is then refluxed for 2 hours. The reaction mixture is diluted with a large volume of alcohol to coagulate the diisocyanate-treated, aldehyde-modified neoprene. The coagulated product is separated, washed with alcohol, and dried. The product has a higher softening point and is less sensitive to solvents than the original aldehyde-modified neoprene. The diisocyanate treated product has a tack point of 195° C. as compared with 60° C. for the original aldehyde-modified neoprene and 45° C. for aldehyde-modified rubber heated for the same length of time in toluene in the absence of diisocyanate.

The aldehyde-modified neoprene used above is prepared as follows: One hundred parts of neoprene (polymerized chloroprene) is plasticized with 0.25% of hexamethyleneammonium hexamethylene dithiocarbamate in the usual way and then dissolved in 900 parts of carbon tetrachloride. To this neoprene solution is added 50 parts of paraformaldehyde. The mixture is heated, with stirring, to 65° C. and 100 parts of a 10% solution of zinc chloride in glacial acetic acid is added. The mixture is heated, with constant stirring, at 65-70° C. for four hours. The product is then coagulated with alcohol and washed several times with alcohol in an internal mixer. The aldehyde-modified neoprene thus obtained is milled to constant weight on a rubber mill and then made into a 10% cement in toluene.

EXAMPLE III

A high tenacity viscose rayon fabric is passed through a solution of 5 parts of trioxane-modified neoprene and 5 parts of hexamethylene diisocyanate in 90 parts of toluene. The fabric is then heated to drive off the toluene and to cause the diisocyanate to react. The resulting fabric, which shows an increase in weight of 17%, is coated with a layer of rubber containing compounding agents for vulcanization, and is then vulcanized. The bond between the rubber and the fabric is stronger than in the case of fabric treated with trioxane-modified rubber only, the former having a bond strength 5.6 times that of the latter.

The process of this invention is believed to involve chemical reaction between the poly —N=C=X compound and the aldehyde-modified rubber. While I do not wish to be bound by my explanation for the mechanism of the process, it is my belief that the process involves chemical reaction of the —N=C=X groups with active hydrogen groups in the aldehyde-modified rubber. Since the —N=C=X compounds used contain more than one —N=C=X group, they may effect cross-linking between different aldehyde-modified rubber molecules.

The present invention is generic to the reaction of organic compounds having a plurality of —N=C=X groups with reaction products of aldehydes and rubbers, including, in addition to the rubbers of the examples, other natural rubbers, e. g., balata, gutta percha, Pontianak rubber, and guayule rubber; and other synthetic rubbers, e. g., the various butadiene and butadiene interpolymer rubbers. Although the reaction products of formaldehyde, its polymers or formaldehyde-yielding derivatives with the above-mentioned rubbers are preferred, the reaction products of other aldehydes, e. g., acetaldehyde, benzaldehyde, and salicylaldehyde, with rubber can also be used. The aldehyde-modified rubbers prepared by the methods described in U. S. 1,640,363 and 1,915,808 are suitable. It is sometimes desirable to treat mixtures of two or more of the aldehyde-modified rubbers simultaneously with the —N=C=X compound or compounds in order to obtain products having special adhesive strength, high softening point, toughness, or other characteristics.

Examples of active hydrogen-containing rubbers which can be employed in place of aldehyde-rubbers include "hydroxylated rubbers" such as the peracetylated rubber and hydrolyzed peracetylated rubber described in U. S. 1,988,488. Rubber di(hydroxyphenyl) is a further example. Other active hydrogen containing rubbers which can be employed are those obtained according to British Patent 486,878 by oxidation of formaldehyde treated rubber with nitric acid which presumably contain carboxyl groups, also those obtained by oxidation of sulfur modified or vulcanized rubbers which presumably contain thiol groups. Still others are the hydrogen polysulfide modified rubbers which also contain thiol groups.

Additional examples of compounds containing a plurality of —N=C=X compounds which can be used in the practice of this invention are: polymethylene diisocyanates and diisothiocyanates, such as ethylene diisocyanate, trimethylene diisocyanate, tetramethylene diisocyanate, pentamethylene diisocyanate, etc.; the corresponding diisothiocyanates; alkylene diisocyanates and diisothiocyanates, such as propylene-1,2-diisocyanate, butylene-1,2-diisocyanate, and butylene-1,3-diisothiocyanate; alkylidene diisocyanates and diisothiocyanates such as ethylidene diisocyanate $(CH_3CH(NCO)_2)$, and heptylidene diisothiocyanate $(CH_3(CH_2)_5CH(CNS)_2)$; cycloalkylene diisocyanates and diisothiocyanates, such as cyclopentylene-1,3-diisocyanate, cyclohexylene-1,4-diisocyanate, and cyclohexylene-1,2-diisothiocyanate; aromatic diisocyanates and diisothiocyanates, such as p-phenylene diisocyanate, 1-methylphenylene-2,4-diisocyanate, naphthylene-1,4-diisocyanate, o,o'-tolane diisocyanate, diphenyl-4,4'-diisothiocyanate, m-phenylene diisothiocyanate, and p-phenylene diisothiocyanate; compounds containing more than two —N=C=X groups, e. g., 1,2,4-benzene triisothiocyanate; aliphatic-aromatic diisocyanates or diisothiocyanates, such as xylylene-1,4-diisocyanate

Xylylene-1,3-diisocyanate

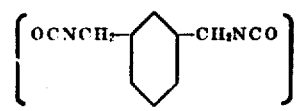

4,4'-diphenylenemethane diisocyanate

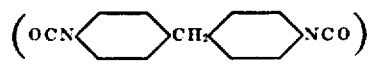

4,4'-diphenylenepropane diisocyanate

and xylylene-1,4-diisothiocyanate

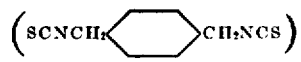

and diisocyanates and diisothiocyanates containing hetero-atoms, such as SCNCH₂OCH₂NCS, SCNCH₂CH₂OCH₂CH₂CNS, and

SCN—N(R)—CS—N(R)—NCS

In fact, any diisocyanate, diisothiocyanate, or mixed isocyanate-isothiocyanate of the general formula XCNRNCX, in which X is oxygen or sulphur and R is a divalent organic radical, will react with the aldehyde modified rubbers to give products according to the present invention. Poly —NCX compounds wherein the polyvalent radical to which the —NCX groups are attached, is hydrocarbon or hydrocarbon interrupted by ether groups are preferred.

The aldehyde-modified rubbers used in the practice of this invention can be prepared with various amounts of aldehyde. It is preferable, however, to remove excess aldehyde before reacting the rubber derivative with the —N=C=X compound. In the case of formaldehyde and natural rubber, the use of 45% of formaldehyde based on the weight of the rubber corresponds approximately to one formaldehyde molecule for each isoprene unit in the rubber. Usually considerably less combined formaldehyde is preferred, quantities in the range of 5 to 35% being generally most suitable. The most valuable products for adhesive and coating applications are those having a combined formaldehyde or trioxane content in this range, since these products are more susceptible to vulcanization. Suitable catalysts for the reaction are zinc chloride, boron trifluoride, sulfuric acid, and p-toluene-sulfonic acid.

Prior to reaction with the —N=C=X compound, the aldehyde-modified rubber can be modified by milling and/or by compounding with a wide variety of compounding ingredients known to the rubber art. Useful compounding ingredients include softeners, peptizing agents, fillers, pigments, dyes, antioxidants, vulcanizing agents and accelerators.

In the process of this invention, the rubber aldehyde reaction product is reacted with the —N=C=X compound, preferably in the presence of a solvent or swelling agent for the aldehyde-modified rubber. The solvent or swelling agent should be inert toward the —N=C=X compound, or at least less reactive than the modified rubber.

The solvent may be employed in amount sufficient only to swell the aldehyde modified rubber, e. g., about twice the weight of the aldehyde-modified rubber. The solvents used include the hydrocarbons and halogenated hydrocarbons, including toluene, naphtha, and carbon tetrachloride. The reaction can be carried out at temperatures ranging from about 0 to 200° C. When ordinary temperatures, e. g., 20 to 30° C., are used, the reaction may take a day or more for completion. At 50–150° C., the temperature at which the reaction is conveniently carried out, the reaction is generally complete within a few minutes to several hours, depending on the surface exposed, the volume of material employed, etc. Only a small amount, e. g., 1 to 2%, of diisocyanate or diisothiocyanate based on the weight of the aldehyde-modified rubber is sufficient to obtain a noticeable change in the aldehyde-modified rubber. In general, however, amounts ranging from 5 to 30% or even higher are used.

Aldehyde-modified rubbers in the form of films or other solid forms can also be treated directly with the —N=C=X compound. Thus, films can be coated with or immersed in a solution of a diisocyanate and heated at 50–100° C. to effect reaction. It is also possible to coat or impregnate filaments, yarns, fabrics, and the like with an aldehyde-modified rubber and then treat the product with an —N=C=X compound. This tends to give improved adhesion between the modified rubber and the material on which it is applied. This is particularly true when the base material is reactive toward —N=C=X compound.

The products of this invention are tough materials of low solubility, the solubility decreasing with the amount of —N=C=X compound used. They are less sensitive to most solvents than are the corresponding unmodified rubbers or the corresponding aldehyde-modified rubbers. They are, however, still capable of vulcanization with sulfur in the usual manner. Vulcanization of diisocyanate-treated, formaldehyde-modified rubbers yields materials having better oil and gasoline resistance than vulcanized rubber or vulcanized formaldehyde-rubber reaction products.

The products of this invention are of value for the preparation of tubing, sheeting, and molded rubber-like articles where an increased resistance to certain organic solvents is desired. In the preparation of these articles, the products can be milled first either alone or in combination with rubber and/or other polymeric hydrocarbons in any desired proportions to obtain products having special characteristics. It is generally desirable to include compounding ingredients so that the products can be vulcanized.

The products of this invention are also useful in the preparation of adhesive, coating, and impregnating compositions for a wide variety of base materials. In these applications it is often desirable to prepare the products in situ in or on the base material. This is done by coating or impregnating the base material with aldehyde-modified rubber and —N=C=X compound and then heating the treated base material to effect reaction. If the base material is also reactive toward the —N=C=X compound, cross-linking of the base material and the aldehyde-rubber may take place, for an unusually good bond between the rubber material and the base material is formed under these conditions. Adhesive applications for which these products are suited include anchor coating compositions for bonding rubber to base materials, particularly where good adhesion between rubber and the base material is required. The products are also useful for bonding fabric to fabric, rubber to metal, and rubber to glass. As illustrated in Example III, the products are useful in bonding rubber to rayon. This is of importance in connection with the preparation of tires.

The above description and examples are intended to be illustrative only. Any modification of or variation therefrom which conforms to the spirit of the invention is intended to be included within the scope of the claims.

What is claimed is:

1. Process which comprises treating an aldehyde-modified rubber from the group consisting of natural rubber and neoprene with an organic compound having from 2 to 3 —N=C=X groups, wherein X is a chalcogen of atomic weight below 33.

2. Process which comprises treating a formaldehyde-modified rubber from the group consisting of natural rubber and neoprene at 0–200° C. with an organic compound having from 2 to 3 —N=C=X groups, wherein X is a chalcogen of atomic weight below 33.

3. Process which comprises reacting, at 50–150° C., a trioxane-modified rubber from the group consisting of natural rubber and neoprene with an organic compound having from 2 to 3 —N=C=X groups, wherein X is a chalcogen of atomic weight below 33.

4. Process which comprises reacting an aldehyde-modified rubber from the group consisting of natural rubber and neoprene with an organic diisocyanate.

5. Process which comprises reacting an aldehyde-modified natural rubber with an organic diisocyanate.

6. Process which comprises reacting a trioxane-modified rubber from the group consisting of natural rubber and neoprene with hexamethylene diisocyanate.

7. A reaction product of an aldehyde-modified rubber from the group consisting of natural rubber and neoprene and an organic compound having from 2 to 3 —N=C=X groups, wherein X is a chalcogen of atomic weight below 33.

8. A reaction product of an organic diisocyanate with a preformed formaldehyde-modified rubber from the group consisting of natural rubber and neoprene.

9. A reaction product of an organic diisocyanate with a preformed aldehyde-modified natural rubber.

10. A reaction product of hexamethylene diisocyanate with a preformed formaldehyde-modified rubber from the group consisting of natural rubber and neoprene.

11. A reaction product of hexamethylene diisocyanate with a preformed trioxane-modified rubber from the group consisting of natural rubber and neoprene.

GEORGE H. LATHAM.

REFERENCES CITED

The following references are of record in the file of this patent:

UNITED STATES PATENTS

| Number | Name | Date |
|---|---|---|
| 1,839,950 | Cadwell | Jan. 5, 1932 |
| 1,988,448 | Hopff et al. | Jan. 22, 1935 |
| 2,277,083 | Dorough | Mar. 24, 1942 |
| 2,313,945 | Kellog et al. | Mar. 16, 1943 |
| 1,640,363 | McGavack | Aug. 30, 1927 |

FOREIGN PATENTS

| Number | Country | Date |
|---|---|---|
| 486,878 | British | June 10, 1938 |

---

Certificate of Correction

Patent No. 2,417,424.   March 18, 1947.

GEORGE H. LATHAM

It is hereby certified that errors appear in the printed specification of the above numbered patent requiring correction as follows: Column 4, line 40, for the patent number "1,988,488" read *1,988,448*; line 69, for "1 2-" read *1,2-*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.* rubber to base materials, particularly where good adhesion between rubber and the base material is required. The products are also useful for bonding fabric to fabric, rubber to metal, and rubber to glass. As illustrated in Example III, the products are useful in bonding rubber to rayon. This is of importance in connection with the preparation of tires.

The above description and examples are intended to be illustrative only. Any modification of or variation therefrom which conforms to the spirit of the invention is intended to be included within the scope of the claims.

What is claimed is:

1. Process which comprises treating an aldehyde-modified rubber from the group consisting of natural rubber and neoprene with an organic compound having from 2 to 3 —N=C=X groups, wherein X is a chalcogen of atomic weight below 33.

2. Process which comprises treating a formaldehyde-modified rubber from the group consisting of natural rubber and neoprene at 0–200° C. with an organic compound having from 2 to 3 —N=C=X groups, wherein X is a chalcogen of atomic weight below 33.

3. Process which comprises reacting, at 50–150° C., a trioxane-modified rubber from the group consisting of natural rubber and neoprene with an organic compound having from 2 to 3 —N=C=X groups, wherein X is a chalcogen of atomic weight below 33.

4. Process which comprises reacting an aldehyde-modified rubber from the group consisting of natural rubber and neoprene with an organic diisocyanate.

5. Process which comprises reacting an aldehyde-modified natural rubber with an organic diisocyanate.

6. Process which comprises reacting a trioxane-modified rubber from the group consisting of natural rubber and neoprene with hexamethylene diisocyanate.

7. A reaction product of an aldehyde-modified rubber from the group consisting of natural rubber and neoprene and an organic compound having from 2 to 3 —N=C=X groups, wherein X is a chalcogen of atomic weight below 33.

8. A reaction product of an organic diisocyanate with a preformed formaldehyde-modified rubber from the group consisting of natural rubber and neoprene.

9. A reaction product of an organic diisocyanate with a preformed aldehyde-modified natural rubber.

10. A reaction product of hexamethylene diisocyanate with a preformed formaldehyde-modified rubber from the group consisting of natural rubber and neoprene.

11. A reaction product of hexamethylene diisocyanate with a preformed trioxane-modified rubber from the group consisting of natural rubber and neoprene.

GEORGE H. LATHAM.

REFERENCES CITED

The following references are of record in the file of this patent:

UNITED STATES PATENTS

| Number | Name | Date |
|---|---|---|
| 1,839,950 | Cadwell | Jan. 5, 1932 |
| 1,988,448 | Hopff et al. | Jan. 22, 1935 |
| 2,277,083 | Dorough | Mar. 24, 1942 |
| 2,313,945 | Kellog et al. | Mar. 16, 1943 |
| 1,640,363 | McGavack | Aug. 30, 1927 |

FOREIGN PATENTS

| Number | Country | Date |
|---|---|---|
| 486,878 | British | June 10, 1938 |

---

Certificate of Correction

Patent No. 2,417,424.        March 18, 1947.

GEORGE H. LATHAM

It is hereby certified that errors appear in the printed specification of the above numbered patent requiring correction as follows: Column 4, line 40, for the patent number "1,988,488" read *1,988,448*; line 69, for "1 2- read *1,2-*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.*